United States Patent
Osawa et al.

(10) Patent No.: US 9,327,644 B2
(45) Date of Patent: May 3, 2016

(54) SOUND GENERATING DEVICE FOR VEHICLE, AND SOUND GENERATING METHOD FOR VEHICLE

(75) Inventors: Hideki Osawa, Shizuoka (JP); Heiji Maruyama, Shizuoka (JP); Yasuyuki Suzuki, Shizuoka (JP); Yosuke Kuno, Shizuoka (JP); Hirofumi Onitsuka, Shizuoka (JP); Yoshikazu Honji, Shizuoka (JP)

(73) Assignees: YAMAHA HATSUDOKI KABUSHIKI KAISHA, Shizuoka (JP); YAMAHA CORPORATION, Shizuoka (JP)

( * ) Notice: Subject to any disclaimer, the term of this patent is extended or adjusted under 35 U.S.C. 154(b) by 477 days.

(21) Appl. No.: 13/883,614

(22) PCT Filed: Apr. 16, 2012

(86) PCT No.: PCT/JP2012/060270
§ 371 (c)(1),
(2), (4) Date: May 6, 2013

(87) PCT Pub. No.: WO2012/141325
PCT Pub. Date: Oct. 18, 2012

(65) Prior Publication Data
US 2013/0230185 A1  Sep. 5, 2013

(30) Foreign Application Priority Data
Apr. 14, 2011 (JP) .................. 2011-090499

(51) Int. Cl.
H04B 1/00 (2006.01)
H04B 15/00 (2006.01)
A61F 11/06 (2006.01)
G10K 11/16 (2006.01)
(Continued)

(52) U.S. Cl.
CPC ............. B60Q 5/00 (2013.01); B60R 11/0217 (2013.01); F01N 1/065 (2013.01); F02M 35/1038 (2013.01); F02M 35/1294 (2013.01); G10K 15/02 (2013.01); F02M 35/021 (2013.01)

(58) Field of Classification Search
CPC ...... B60Q 5/00; B60R 11/0217; F01N 1/065; F02M 35/1038; F02M 35/1294; F02M 35/021; G10K 15/02
USPC .......................................... 381/86, 94.7, 71.4
See application file for complete search history.

(56) References Cited

U.S. PATENT DOCUMENTS 7,088,829 B1 * 8/2006 Schick ..................... B60Q 5/00
381/61
2008/0192954 A1 * 8/2008 Honji ..................... G10K 15/04
381/86

FOREIGN PATENT DOCUMENTS

JP 02-041953 A 2/1990
JP 2002-520680 A 7/2002
JP 2008-013064 A 1/2008

OTHER PUBLICATIONS

Official Communication issued in International Patent Application No. PCT/JP2012/060270, mailed on Jul. 10, 2012.
(Continued)

*Primary Examiner* — Vivian Chin
*Assistant Examiner* — Douglas Suthers
(74) *Attorney, Agent, or Firm* — Keating and Bennett, LLP

(57) ABSTRACT

Provided is a sound generating device (20) for a vehicle, including: a plurality of pressure sensors (21a to 21d) for detecting air pressures of an air intake sound of an engine (12) and outputting the air pressures as sound pressure signals; a signal processing unit (24) for performing processing of changing the sound pressure signals in accordance with a driving condition of a vehicle (10); and loudspeakers (28a and 28b) for outputting the sound pressure signals as the air intake sound of the engine (12). Then, the plurality of pressure sensors (21a to 21d) are provided at an interval in a circumferential direction of an outer periphery of an air intake duct (15) at positions in a vicinity of an air flow meter (18) on an air cleaner (16) side with respect to a center of the air intake duct (15), the air intake duct (15) connecting the air cleaner (16) to a throttle body (17).

20 Claims, 13 Drawing Sheets

(51) Int. Cl.
*H03B 29/00* (2006.01)
*B60Q 5/00* (2006.01)
*B60R 11/02* (2006.01)
*F02M 35/10* (2006.01)
*F02M 35/12* (2006.01)
*F01N 1/06* (2006.01)
*G10K 15/02* (2006.01)
*F02M 35/02* (2006.01)

(56) References Cited

OTHER PUBLICATIONS

Osawa et al.; "Vehicule Sound Generation Apparatus, and Vehicle Sound Generation Method"; U.S. Appl. No. 14/394,537, filed Oct. 15, 2014.

* cited by examiner

SOUND GENERATING DEVICE FOR VEHICLE, AND SOUND GENERATING METHOD FOR VEHICLE

TECHNICAL FIELD

The present invention relates to a sound generating device for a vehicle and a sound generating method for a vehicle, which are configured to transmit an air intake sound of an engine of a vehicle to an occupant inside the vehicle.

BACKGROUND ART

In vehicles such as an automobile provided in recent years, in order to enhance the comfort level of occupants and prevent emission of noise to the outside of the vehicle, engine sound and other sound generated in association with a running condition of the vehicle have been reduced to the extent possible. With this configuration, however, there arises a problem in that the actual running condition such as vehicle speed and the sound audible to the occupant are less related to each other and, as a result, the driving feel of the automobile is deteriorated. Therefore, there has been developed a sound generating device for a vehicle, which is configured to generate the engine sound from a loudspeaker only toward the inside of a vehicle cabin without emitting the sound to the outside (see, for example, JP 2008-13064 A).

This sound generating device for a vehicle (driving sound transmitting device) includes a sound pressure sensor arranged inside an air inlet or an air intake pipe of an engine, a rotational pulse sensor for detecting an ignition pulse of the engine, an accelerator opening degree sensor for detecting a depressing amount of an accelerator pedal, a loudspeaker arranged inside an engine room or a vehicle cabin, for outputting driving sound of the engine, and a controller. The controller includes an order filter for changing a sound wave signal of the sound pressure sensor to be allowed to pass therethrough in accordance with an input frequency from the rotational pulse sensor, and a variable attenuator for increasing and decreasing a sound pressure of the sound wave signal passing through the order filter in accordance with an opening degree signal from the accelerator opening degree sensor. The sound wave signal output from the controller is amplified by an amplifier and output from the loudspeaker.

SUMMARY OF INVENTION

In the above-mentioned conventional sound generating device for a vehicle, however, a plurality of sound pressure sensors are installed on an outside air inlet of an air cleaner and an outside air inlet of an air duct arranged on an upstream side of the air cleaner, or on an air intake manifold. Therefore, when the sound pressure sensors are installed on the air cleaner and the outside air inlet of the air cleaner, the air intake sound becomes weaker and thus the sound pressure of the air intake sound is not easily detected. As a result, a highly accurate device is required for reproduction of the air intake sound. When the sound pressure sensors are installed on the air intake manifold, the sound pressure sensors are located close to the engine that generates combustion sound, and hence the fluctuation in pulsation becomes larger, which leads to a problem in that the sound generated from the loudspeaker becomes harsh, irritating sound.

Further, when microphones are used as the sound pressure sensors and installed on the air cleaner and the outside air inlet of the air cleaner, there arises a further problem in that the microphones also detect sound from the outside, which makes it difficult to obtain a preferred air intake sound of the engine. In addition, durability against heat, moisture, oil, dust, and the like is required in the engine room, but the microphone has a problem in that it is difficult to maintain the performance over a long period of time under such an environment.

The present invention has been made to solve the above-mentioned problems, and therefore has an object to provide a sound generating device for a vehicle and a sound generating method for a vehicle, which are capable of generating, inside a vehicle, a comfortable sound which is less noisy and close to an actual air intake sound of the engine.

In order to achieve the above-mentioned object, the sound generating device for a vehicle according to the present invention has the following features in configuration. That is, a sound generating device for a vehicle, which is configured to transmit an air intake sound of an engine of a vehicle to an occupant inside the vehicle, includes: a plurality of pressure sensors for detecting pressures of air intake pulsation of the engine and outputting the pressures as pressure signals, the plurality of pressure sensors being provided at an interval in a circumferential direction of an outer periphery of an air intake duct at positions on an air cleaner side with respect to a center of the air intake duct, the air intake duct connecting the air cleaner to an air amount control valve, the air cleaner being provided on an air inlet side on which outside air is to be taken in, the air amount control valve being provided on the engine side; a signal processing unit for performing processing of changing the pressure signals in accordance with a driving condition of the vehicle; and a loudspeaker installed inside the vehicle, for outputting a sound pressure signal processed by the signal processing unit as the air intake sound of the engine.

With the sound generating device for a vehicle according to the present invention, the air intake sound of the engine corresponding to the driving condition in accordance with the operation of the driver is clearly audible inside the vehicle while being emitted to the outside as a small sound. Further, in the present invention, the pressure sensors are provided to the air intake duct, which connects the air amount control valve to the air cleaner, at the positions on the air cleaner side. Accordingly, the pressure fluctuation of the air intake pulsation can be detected effectively without an effect of sound from the outside of the vehicle, such as wind noise at the time of running the vehicle, driving sound of the engine, and combustion sound. Thus, the sound which the occupant hears inside the vehicle becomes close to the actual air intake sound of the engine.

Note that, the engine sound that is actually audible when the vehicle is running predominantly contains a component which is audible from an exterior side on the upstream side of the air cleaner, and according to the present invention, the air intake sound reproduced from the loudspeaker is close to the actual air intake sound. Further, in the present invention, the plurality of pressure sensors are provided, and the output signals thereof are added together to boost the pressure signal. With this configuration, the pressure fluctuation can be detected effectively even in a low load state, in which the depressing amount of the accelerator is small. The pressure sensor generally has a smaller S/N ratio as compared to a general audio microphone, and is slightly hard to handle. However, when the plurality of pressure sensors are arranged at an interval in a circumferential direction of the outer periphery of the air intake duct, that is, the plurality of pressure sensors are arranged in the same cross section orthogonal to the axial direction of the air intake duct, the intake air pressure signals are added together in synchronization (inphase), and thus it is possible to relatively reduce noise generated by the pressure sensors themselves or a noise component generated due to local turbulence. If "n" pressure sensors are arranged, it is expected that the S/N ratio is improved by 10 log n (dB) as compared to a case of using a single pressure sensor.

A feature in another configuration of the sound generating device for a vehicle according to the present invention is that the sound generating device for a vehicle further includes a second pressure sensor provided between the engine and the air amount control valve in addition to the plurality of pressure sensors, the second pressure sensor being configured to detect a pressure of the air intake pulsation of the engine and output the pressure as a pressure signal.

With the sound generating device for a vehicle according to the present invention, it is possible to detect the air intake pulsation on the downstream side of the air amount control valve as well as the upstream side. Accordingly, the air intake sound to be reproduced from the loudspeaker corresponds to the air intake pulsation of the engine irrespective of the open/close condition of the air amount control valve. For example, when the plurality of pressure sensors are provided only on the upstream side of the air amount control valve, in an idling, deceleration, or low load state, in which the air amount control valve is substantially closed or is opened at a small opening degree, the air intake pulsation of the engine that is generated along with the opening and closing operation of the air intake valve is restricted by the air amount control valve in the propagation toward the upstream side. Therefore, in the air intake duct located on the upstream side of the air amount control valve, the pressure fluctuation of the air intake pulsation of the engine is extremely small, which makes it difficult to generate the air intake sound from the loudspeaker. However, the pressure fluctuation of the air intake pulsation of the engine on the downstream side of the air amount control valve is larger than that on the upstream side, and hence, when the second pressure sensor is provided, the sound due to the pulsation of the engine can be generated even in such a case as described above. Accordingly, it is possible to boost the sound to be reproduced from the loudspeaker in the idling state or the like.

A feature in still another configuration of the sound generating device for a vehicle according to the present invention is that the sound generating device for a vehicle further includes a tubular communication portion which extends outward and is provided at a position between the engine and the air amount control valve, at which the second pressure sensor is installed, that the second pressure sensor is installed at a distal end of the tubular communication portion, and that a distance between a proximal end portion of the tubular communication portion and a pressure sensitive portion of the second pressure sensor is set to 4 cm or more. With the sound generating device for a vehicle according to the present invention, the tubular communication portion for installing the second pressure sensor is set to be long, and hence harsh sound generated due to the pulsation of the engine can be attenuated and suppressed. Note that, an aperture may be provided in the middle of the communication portion so that similar effects can be obtained.

A feature in yet another configuration of the sound generating device for a vehicle according to the present invention is that the second pressure sensor is configured to measure both a positive pressure and a negative pressure. In a case of using a pressure sensor which can measure only a negative pressure, if a range of a positive pressure is generated when, for example, the accelerator is depressed abruptly, the sound generated from the loudspeaker may be distorted or clipped.

In the sound generating device for a vehicle according to the present invention, the second pressure sensor provided on the downstream side of the air amount control valve is configured to measure both the positive pressure and the negative pressure. Accordingly, it is possible to prevent the distortion and clipping of the sound through accurate detection without erasing the air intake pulsation over the entire load transition period.

A feature in yet another configuration of the sound generating device for a vehicle according to the present invention is that the second pressure sensor is configured to output a pulsating current signal containing an AC component and a DC component. In this case, it is preferred that the output signal of the AC component is subjected to noise reduction processing. With this configuration, the engine rpm can be recognized through use of the AC component signal output from the second pressure sensor, and the load on the engine can be recognized through use of the DC component signal. Based on those pieces of information, the driving condition is determined so that the sound pressure can be increased and decreased appropriately.

A feature in yet another configuration of the sound generating device for a vehicle according to the present invention is that the engine has an individual throttle body system including throttle bodies arranged for respective cylinders, that the air amount control valve includes throttle valves of the throttle bodies, that the throttle bodies are provided in communication to one another through a balance pipe portion at positions on a downstream side of the throttle valves which are provided to the throttle bodies, respectively, and that the second pressure sensor is provided to the balance pipe portion.

In the sound generating device for a vehicle according to the present invention, even in the case of the vehicle including the individual throttle bodies, the air intake sound of the engine corresponding to the driving condition in accordance with the operation of the driver is clearly audible inside the vehicle while being emitted to the outside as a small sound. Further, the second pressure sensor is provided to the balance pipe portion, and hence air intake pulsation components of all the cylinders of the engine can be detected. Note that, in the present invention, the air intake duct refers to a portion between the individual throttle bodies and the air cleaner, and when a surge tank is located therebetween, it is assumed that the surge tank is also included in the air intake duct.

A feature in yet another configuration of the sound generating device for a vehicle according to the present invention is that the engine is an engine including a continuously variable valve lift mechanism for controlling an engine output through stepless control of a lift of an air intake valve and a timing, and that the air amount control valve is the air intake valve. In the sound generating device for a vehicle according to the present invention, even in the case of the vehicle including the continuously variable valve lift mechanism, the air intake sound of the engine corresponding to the driving condition in accordance with the operation of the driver is clearly audible inside the vehicle while being emitted to the outside as a small sound.

A feature in yet another configuration of the sound generating device for a vehicle according to the present invention is that the sound generating device for a vehicle further includes a noise gate processing unit for performing noise gate processing for the pressure signals before being processed by the signal processing unit. In this case, the processing by the signal processing unit may be performed for the pressure signals subjected to the noise gate processing and then to A/D conversion. With the sound generating device for a vehicle according to the present invention, natural sound can be generated by removing the noise in the unnecessary range. Note that, the noise gate processing may be performed for the pressure signals subjected to the A/D conversion.

A feature in yet another configuration of the sound generating device for a vehicle according to the present invention is that the sound generating device for a vehicle further includes a noise reduction processing unit for performing noise reduction processing for the pressure signals before or after being processed by the signal processing unit. In this case, it is preferred that the processing by the signal processing unit is performed for the pressure signals subjected to the noise reduction processing. Note that, the noise reduction processing according to the present invention refers to, for example, processing using spectral subtraction, and with this configuration, natural sound can be generated by reducing the noise in the unnecessary range.

A feature in yet another configuration of the sound generating device for a vehicle according to the present invention is that the sound generating device for a vehicle further includes a filter created based on a relationship between a frequency and a gain, and that the signal processing unit performs processing of changing the sound pressure signal through use of the filter. According to the present invention, the gain can be changed arbitrarily in accordance with each frequency. Further, it is preferred that a plurality of types of filters are prepared and, by selecting an appropriate one of the filters, the sound quality of the air intake sound to be generated from the loudspeaker is changed variously to, for example, that of an engine sound of a normal car or an engine sound of a sport car.

A feature in yet another configuration of the sound generating device for a vehicle according to the present invention is that the air amount control valve is a throttle valve of a throttle body, that the sound generating device further includes: a rotation sensor for detecting an rpm of the engine; an opening degree sensor for detecting an opening degree of the throttle valve; and a sound pressure amplification map created based on a relationship between the rpm of the engine detected by the rotation sensor and the opening degree of the throttle valve detected by the opening degree sensor, and that the signal processing unit performs sound pressure amplification processing for the sound pressure signal through use of the sound pressure amplification map.

According to the present invention, based on the value of the engine rpm detected by the rotation sensor and the value of the throttle valve opening degree detected by the opening degree sensor, sound pressure amplification processing can be performed for the pressure signals output from the pressure sensors, and the entire gain of the filter characteristics for processing the pressure signals output from the pressure sensors can be increased. The sound pressure amplification map in this case may be created arbitrarily, but it is preferred that the sound pressure amplification map is configured to greatly amplify the pressure signals in a low rpm/low load state and slightly amplify the pressure signals in a high rpm/high load state. In addition, according to the present invention, the air intake sound to be output from the loudspeaker can be reproduced inside the vehicle cabin as an air intake sound having an attenuation characteristic and a sound transmission loss close to those of the actual air intake sound of the engine. Note that, as the opening degree sensor, there may be employed a sensor for directly detecting a rotational angle of the throttle valve, or a sensor for detecting the depressing amount of the accelerator as the throttle valve opening degree.

A feature in yet another configuration of the sound generating device for a vehicle according to the present invention is that the sound generating device for a vehicle further includes: a rotation sensor for detecting an rpm of the engine; and a gain control map created based on a relationship between the frequency and the gain, and that the signal processing unit determines the frequency based on the rpm of the engine detected by the rotation sensor and a number of cylinders of the engine, and controls the gain for the sound pressure signal through use of a value of the determined frequency and the gain control map. In this case, the frequency is preferred to be a ⅓-octave center frequency, but may be higher or lower than the ⅓-octave center frequency because the effect is still obtained to a varying degree.

According to the present invention, it is possible to intensify a frequency component having an order that is an integral multiple of a fundamental frequency of the engine combustion determined in accordance with the number of cylinders of the engine. The frequency can be calculated based on the engine rpm and the number of cylinders, and the gain is increased in a frequency range corresponding to the engine rpm through use of the gain control map, with the result that the sound pressure signal can be intensified based on the engine rpm in accordance with the order component. For example, in a four-cycle engine, the combustion occurs in a cylinder once for every two rotations, and hence the fundamental frequency is a frequency that is half of the number of engine rotations.

In a case of four cylinders, when the combustion occurs at regular intervals without overlapping, the frequency becomes four times. The frequency can be determined based on the frequency thus calculated. Note that, the human ear cannot perceive a slight difference in frequency, but can perceive a difference quite clearly when the frequency differs by about ⅓ octave. Thus, when the gain control map is created based on, for example, the relationship between the ⅓-octave frequency and the gain, such a gain control map is more effective because the sound pressure signal can be processed at a level suited to the human audibility.

A feature in yet another configuration of the sound generating device for a vehicle according to the present invention is that the air amount control valve is a throttle valve of a throttle body, that the sound generating device further includes: a rotation sensor for detecting an rpm of the engine; an opening degree sensor for detecting an opening degree of the throttle valve; and an effector processing map having a compressor processing region and a reverberator processing region, the effector processing map being created based on a relationship between the rpm of the engine detected by the rotation sensor and the opening degree of the throttle valve detected by the opening degree sensor, and that the signal processing unit performs compressor processing or reverberator processing for the sound pressure signal through use of the effector processing map. In this case, it is preferred that the compressor processing is performed when both of a value of the rpm of the engine detected by the rotation sensor and a value of the opening degree of the throttle valve detected by the opening degree sensor are small, and the reverberator processing is performed when one or both of the value of the rpm of the engine detected by the rotation sensor and the value of the opening degree of the throttle valve detected by the opening degree sensor are large.

In the present invention, the compressor processing or the reverberator processing is performed, in accordance with the driving condition of the vehicle, for the pressure signals output from the pressure sensors or the sound pressure signal which is originally output from the pressure sensors and is processed based on the filter characteristics. Accordingly, the sound pressure can be boosted and a reverberation effect can be exerted on the air intake sound to be generated from the loudspeaker, to thereby produce persistence of sound. In this case, the compressor processing for boosting the sound pressure is performed in a low rpm/low load state, in which both of the value of the engine rpm detected by the rotation sensor and the value of the throttle valve opening degree detected by the opening degree sensor are small.

In addition, the reverberator processing is performed in a high rpm state, in which the value of the engine rpm detected by the rotation sensor is large, in a high load state, in which the value of the throttle valve opening degree detected by the opening degree sensor is large, and in a high rpm/high load state, in which both the values are large. Accordingly, a comfortable air intake sound can be generated from the loudspeaker. Note that, when the compressor processing is performed in the high rpm state or the high load state, a portion of a high sound pressure level is clipped and the persistence of sound is lost. Therefore, in such a state, the reverberator processing is performed to produce the persistence of sound.

A feature in yet another configuration of the sound generating device for a vehicle according to the present invention is that the sound generating device for a vehicle further includes: an acceleration sensor for detecting an acceleration of the vehicle; and a sound pressure amplification map created based on the acceleration of the vehicle detected by the acceleration sensor, and that the signal processing unit performs sound pressure amplification processing for the sound pressure signal through use of the sound pressure amplification map.

According to the present invention, based on the value of the acceleration detected by the acceleration sensor, the sound pressure amplification processing can be performed for the pressure signals output from the pressure sensors, and the entire gain of the filter characteristics for processing the pressure signals output from the pressure sensors can be increased. In this case, the acceleration sensor may be installed at an arbitrary position of the vehicle, and hence the installation is facilitated without modifying the vehicle or laying complicated wiring.

A feature in yet another configuration of the sound generating device for a vehicle according to the present invention is that the sound generating device for a vehicle further includes an air flow meter installed in the vicinity of the air cleaner, for detecting a flow rate of air, and that the plurality of pressure sensors are provided to the air intake duct at positions within a range of 20 cm or less from the air flow meter toward the air amount control valve. According to the present invention, the plurality of pressure sensors can detect the intake air pressure pulsation generated in the air intake duct under a state in which noise is reduced. There are air intake ducts having various lengths, but results of an experiment were satisfactory when the pressure sensors were provided at the positions within the range of 20 cm or less from the air flow meter toward the throttle body even though a short air intake duct was employed.

A feature in yet another configuration of the sound generating device for a vehicle according to the present invention is that the sound generating device for a vehicle further includes a plurality of tubular communication portions which extend outward from an outer peripheral portion of the air intake duct, that the plurality of pressure sensors are installed at distal ends of the plurality of tubular communication portions, respectively, and that a distance between a proximal end portion of each of the plurality of tubular communication portions on the air intake duct side and each of pressure sensitive portions of the plurality of pressure sensors is set to 4 cm or less.

When the frequency detected by the plurality of pressure sensors is, for example, 2 kHz or higher, noise uncomfortable to the occupant may be reproduced. Further, the pressure sensor generally outputs a pulsating current containing a DC component as a signal obtained through the detection of the pressure fluctuation, but some trouble may arise when this signal is used directly as the sound signal. This is because the sound signal generally contains an AC component alone. Therefore, in the present invention, in order to prevent the uncomfortable noise and obtain a signal which can be handled in a general audio device, the signal is subjected to filtering through use of a high-pass filter which cuts off a component equal to or lower than an extremely low frequency of 1 Hz or the like, or a low-pass filter which cuts off a frequency component equal to or higher than 2 kHz. The pressure sensors to be used may have a sensitivity range from 1 Hz to 2 kHz. In those cases, the lengths of the communication portions for connecting the air intake duct to the pressure sensors are set to 4 cm or less, and hence resonance can be prevented from occurring in the communication portions between the air intake duct and the pressure sensors.

That is, assuming that the sound velocity of the air intake sound is 340 m/s and the upper limit frequency necessary for the air intake sound is 2 kHz, the wavelength can be calculated based on an expression: (sound velocity)/(frequency), that is, the wavelength is 170 mm. In the case of the tubular members which are opened on one side and closed on the other side, such as the communication portions for connecting the air intake duct to the pressure sensors, the resonance occurs when the lengths are equal to or more than a quarter of the wavelength, and thus 42.5 mm or more. Therefore, in consideration of some allowance, the distance between the air intake duct and each of the pressure sensitive portions of the pressure sensors is set to 4 cm or less so that the lengths become smaller than a quarter of the wavelength of the frequency to be determined. Accordingly, the resonance can be prevented. According to the present invention, the pressure sensors are provided through the respective communication portions, and thus the adverse effect on the detection to be performed by the pressure sensors can be prevented.

A feature in yet another configuration of the sound generating device for a vehicle according to the present invention is that the plurality of pressure sensors are configured to measure both a positive pressure and a negative pressure, and that outputs from the plurality of pressure sensors are added together. In a case of using a pressure sensor which can measure only a negative pressure, if a range of a positive pressure is generated when, for example, the accelerator is depressed abruptly, the sound generated from the loudspeaker may be distorted or clipped. In the sound generating device for a vehicle according to the present invention, the plurality of pressure sensors provided on the upstream side of the air amount control valve are configured to measure both the positive pressure and the negative pressure. Accordingly, it is possible to prevent the distortion and clipping of the sound through accurate detection without erasing the air intake pulsation over the entire load transition period.

A feature in yet another configuration of the sound generating device for a vehicle according to the present invention is that output signals of the plurality of pressure sensors are sent to the signal processing unit after DC components are removed through a filter. The sound signal generally contains an AC component alone, and hence it is not preferred that the signal containing a DC component is used directly as the sound signal. With the sound generating device for a vehicle according to the present invention, the DC components are removed through the filter from the output signals of the plurality of pressure sensors provided on the upstream side of the air amount control valve. Accordingly, the uncomfortable noise can be prevented and a suitable sound signal can be obtained.

The sound generating method for a vehicle according to the present invention has the following feature in configuration. That is, a sound generating method for a vehicle, which is configured to transmit an air intake sound of an engine of a vehicle to an occupant inside the vehicle, includes a pressure signal outputting step of detecting pressures of air intake pulsation of the engine and outputting the pressures as pressure signals by a plurality of pressure sensors provided at an interval in a circumferential direction of an outer periphery of an air intake duct at positions on an air cleaner side with respect to a center of the air intake duct, the air intake duct connecting the air cleaner to an air amount control valve, the air cleaner being provided on an air inlet side on which outside air is to be taken in, the air amount control valve being provided on the engine side; a signal processing step of performing, by a signal processing unit, processing of changing the pressure signals in accordance with a driving condition of the vehicle; and an air intake sound outputting step of outputting, by a loudspeaker installed inside the vehicle, a sound pressure signal subjected to the signal processing as the air intake sound of the engine.

With the sound generating method for a vehicle according to the present invention, it is possible to generate, inside a vehicle, a comfortable sound which is less noisy and close to the actual air intake sound of the engine.

Note that, in the present invention, it is preferred that the loudspeaker is arranged so as to generate the air intake sound in the vehicle from a side on which the engine is arranged in a direction toward the inside of the vehicle cabin. It is further preferred that the loudspeaker is arranged toward the driver seat. With this configuration, the air intake sound reproduced from the loudspeaker is audible from the side on which the engine is arranged, and hence the occupant may feel as if he/she heard the actual air intake sound of the engine. In addition, the air intake sound is reproduced from the loudspeaker toward the driver sitting on the driver seat, and hence the air intake sound is audible directly to the driver so that the driving feel is enhanced.

Further, an odd or even number of loudspeakers may be provided, but when an odd number of loudspeakers are provided, it is preferred that one of the loudspeakers is arranged at the center of the vehicle in a width direction. Accordingly, there is no such situation that the air intake sound is audible from only one side of the vehicle in the width direction, thereby improving the balance of the direction in which the air intake sound is audible. In addition, the loudspeaker may be arranged at an invisible position, such as the inside of a dashboard located in the front of the vehicle cabin of the vehicle, or a visible position inside the vehicle cabin, but it is preferred that the loudspeaker is directly fixed to a position on the vehicle body side, such as a wall surface of the dashboard. With this configuration, the air intake sound is audible from the inside of the engine of the vehicle body, and hence the driver may naturally perceive the fluctuation of the air intake sound. Further, vibration propagation of the vehicle body may be utilized so that the driver may perceive the air intake sound from the entire vehicle body.

DESCRIPTION OF EMBODIMENTS (First Embodiment)

Figure 1:
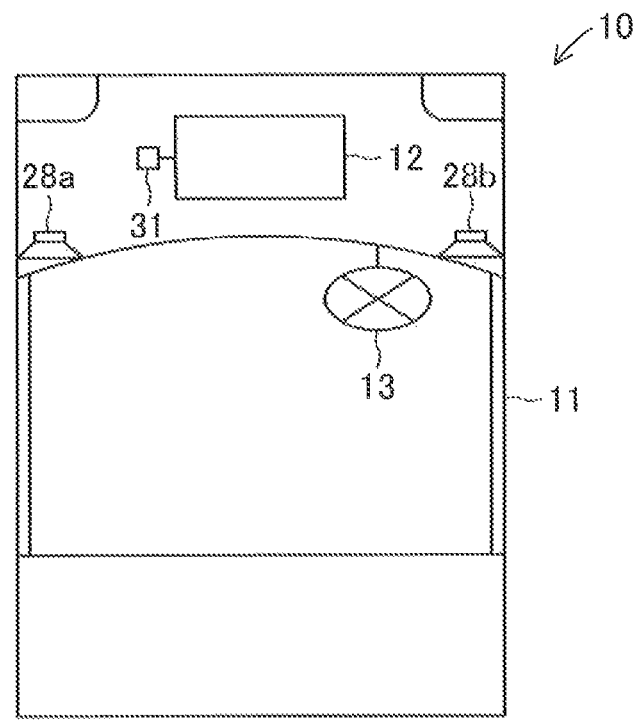
[FIG. 1] A schematic plan view illustrating an automobile including a sound generating device for a vehicle according to a first embodiment of the present invention.
Figure 2:
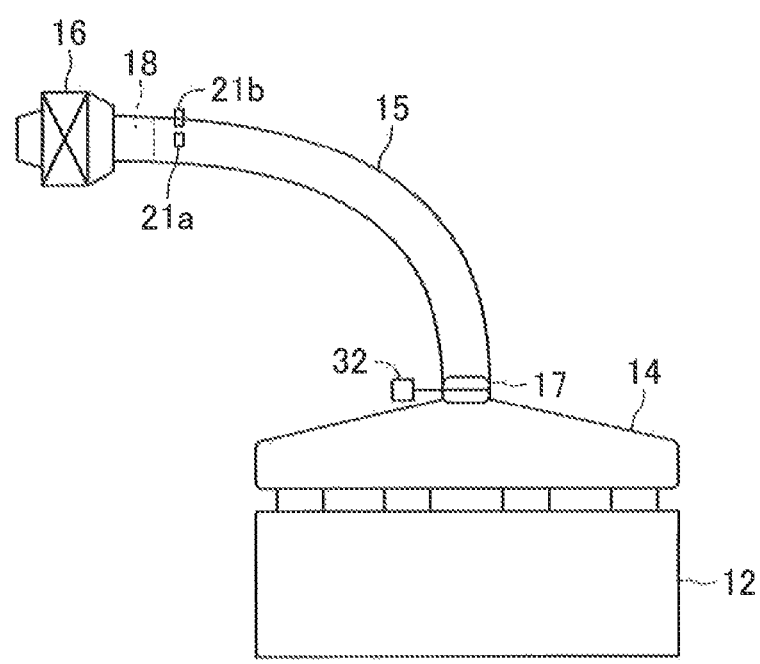
[FIG. 2] A schematic view illustrating installation positions of pressure sensors of the sound generating device for a vehicle.

In the following, a first embodiment of the present invention is described with reference to the drawings. FIG. 1 schematically illustrates an automobile 10 including a sound generating device 20 for a vehicle (see FIG. 3) according to this embodiment. The automobile 10 is a front-engine, front-wheel-drive (FF) car or a front-engine, rear-wheel-drive (FR) car, which includes an engine 12 arranged at the front center of a vehicle body 11. The automobile 10 includes a pair of front wheels (not shown) provided on both sides in the front of the vehicle body 11, a pair of rear wheels (not shown) provided on both sides in the rear of the vehicle body 11, and a steering wheel 13. As illustrated in FIG. 2, an air cleaner 16 is connected to the engine 12 via a surge tank 14 and an air intake duct 15. A throttle body 17 is installed at a position where the surge tank 14 and the air intake duct 15 are coupled to each other. An air flow meter 18 is installed at an end portion of the air intake duct 15 on the air cleaner 16 side.

Outside air is taken into the air cleaner 16 via an air duct provided on an exterior side, and is delivered to the air intake duct 15 after foreign matters are removed through the air cleaner 16. In the throttle body 17, a throttle valve is arranged, which rotates about a shaft to open and close an air passage in the throttle body 17. The air passing through the air intake duct 15 is sucked into the surge tank 14 in accordance with an opening degree of the throttle valve. The throttle valve of the throttle body 17 serves as an air amount control valve according to the present invention. The surge tank 14 temporarily accumulates the air to reduce the flow rate of the air, thereby supplying a uniform amount of air to a plurality of cylinders of the engine 12. Then, the engine 12 mixes the air supplied from the surge tank 14 with a fuel supplied from a fuel system to cause combustion, and accordingly drive power is generated. The air flow meter 18 detects the flow rate of the air flowing into the air intake duct 15 from the air cleaner 16.

Figure 3:
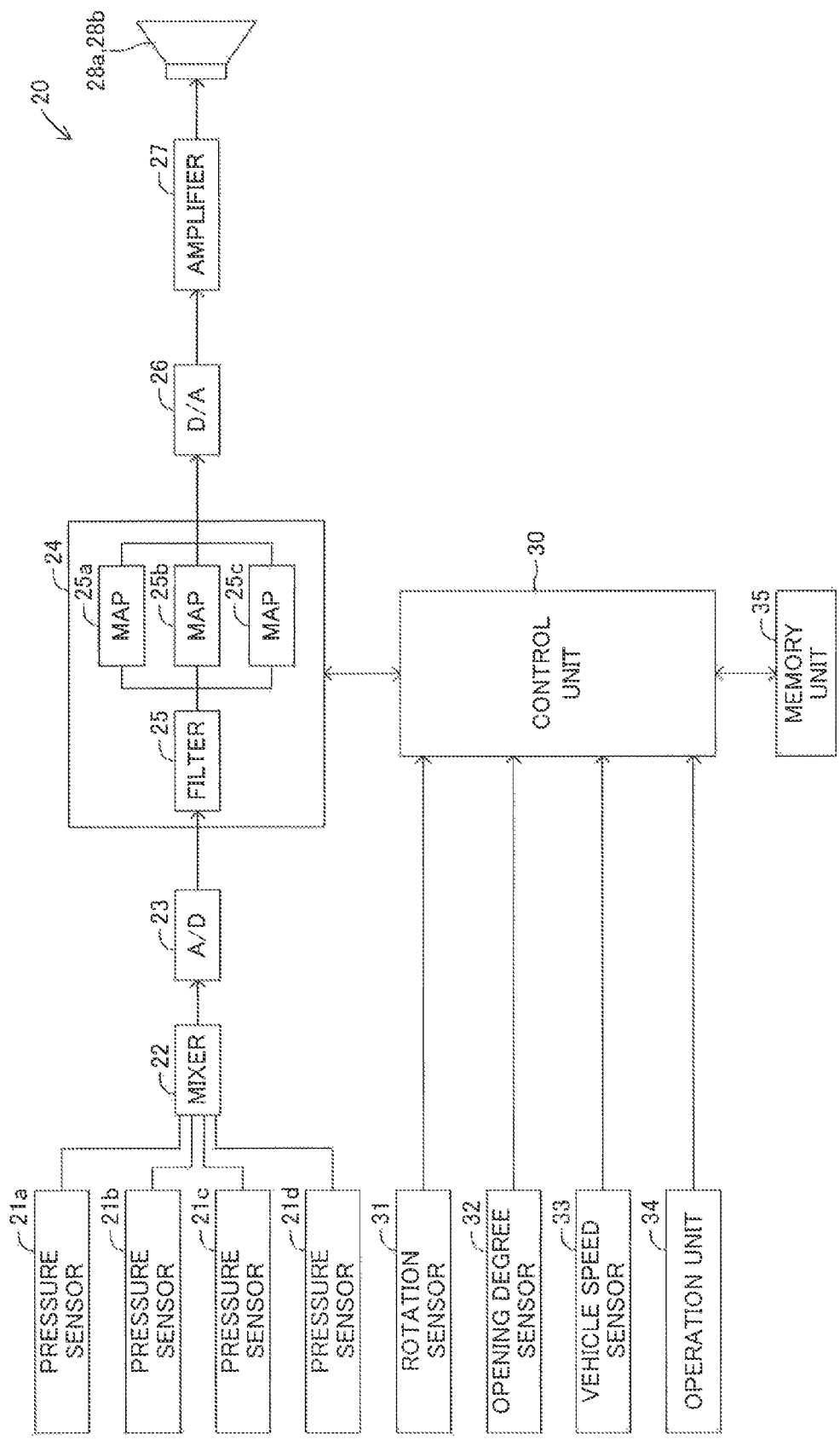
[FIG. 3] A block diagram of the sound generating device for a vehicle.
Figure 4:
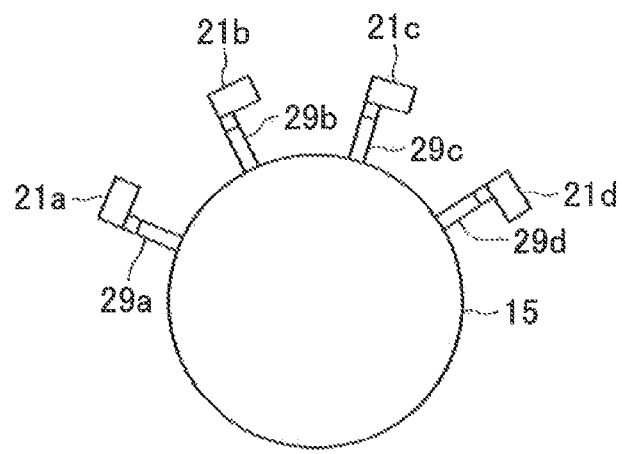
[FIG. 4] A schematic sectional view illustrating a positional relationship between an air intake duct and the pressure sensors.

As illustrated in FIG. 3, the sound generating device 20 for a vehicle includes four pressure sensors 21a, 21b, 21c, and 21d, a mixer 22, an A/D converter 23, a signal processing unit 24, a D/A converter 26, an amplifier 27, and loudspeakers 28a and 28b. A control unit 30 is connected to the signal processing unit 24. Further, the sound generating device 20 for a vehicle includes a rotation sensor 31, an opening degree sensor 32, a vehicle speed sensor 33, an operation unit 34, and a memory unit 35, which are connected to the control unit 30. The pressure sensors 21a to 21d are connected to an upper portion of the outer periphery of the air intake duct 15 at positions in the vicinity of the air flow meter 18 (see FIG. 2) through, as illustrated in FIG. 4, tubular communication portions 29a to 29d provided equiangularly. The pressure sensors 21a to 21d are configured to output a pressure fluctuation of air intake pulsation in the air intake duct 15 as a voltage fluctuation.

Figure 5:
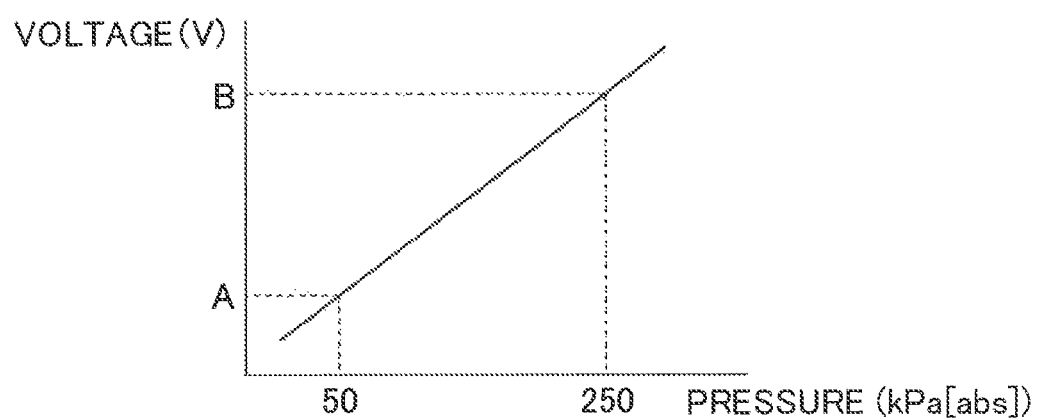
[FIG. 5] A graph showing pressure characteristics of the pressure sensors.
Figure 6:
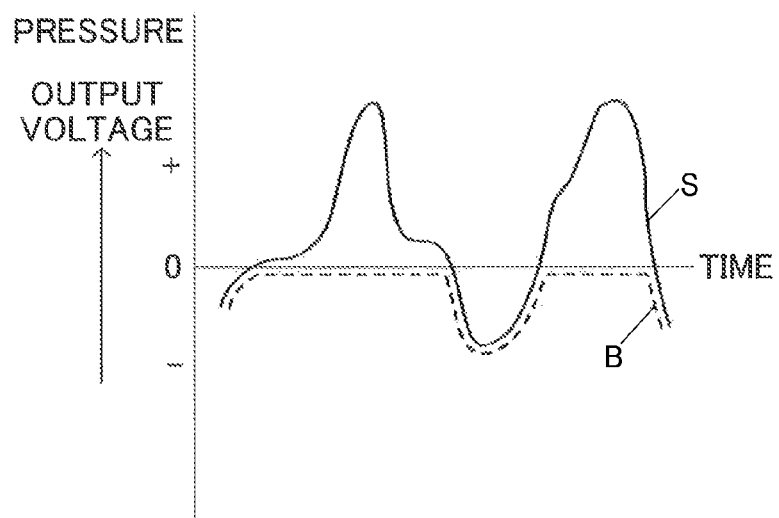
[FIG. 6] A graph showing output waveforms of the pressure sensors.

FIG. 5 shows pressure characteristics of the pressure sensors 21a to 21d, and shows that the pressures applied to the pressure sensors 21a to 21d are proportional to the respective voltages thus generated. Further, the pressure sensors 21a to 21d include sensors for detecting both a positive pressure and a negative pressure. The solid line of FIG. 6, which is indicated by the label "S", represents an example of an output waveform indicating a relationship between the pressure and time in a case where the pressure is detected by each of the pressure sensors 21a to 21d. Note that, the broken line of FIG. 6, which is indicated by the label "B", represents an output waveform indicating a relationship between the pressure and time in a case where the pressure is detected through use of a pressure sensor which detects only a negative pressure of the same pressure as that represented by the solid line. In this graph, values of the pressure which are equal to or higher than "0" are all cut off. Further, the pressure sensors 21a to 21d have a sensitivity range from 1 Hz to 2 kHz. Note that, a pressure sensor having a sensitivity range of 0 Hz or higher may be used instead. As pressure signals to be output from the pressure sensors 21a to 21d, DC components are removed through a filter (not shown) which cuts off a DC component and allows only an AC component to pass therethrough, and hence only AC components are sent to the mixer 22.

The communication portions 29a to 29d are each formed of a flexible resin tube having an inner diameter of 3 mm, an outer diameter of 6 mm, and a length of 4 cm or less (in this embodiment, 4 cm), and extend upward from the upper portion of the outer periphery of the air intake duct 15 with their inner portions provided in communication to the inside of the air intake duct 15. The communication portions 29a to 29d are installed equiangularly, and the angle between the communication portions 29a and 29d is set to 150 degrees or less. The pressure sensors 21a to 21d are installed to the upper ends of the corresponding communication portions 29a to 29d.

The pressure sensors 21a to 21d have their pressure sensitive portions oriented toward the communication portions 29a to 29d to close the upper ends of the communication portions 29a to 29d, respectively. Further, the center portions of the proximal end portions of the communication portions 29a to 29d are located at positions within a range of 20 cm or less from the air flow meter 18. The pressures of the air intake pulsation detected by the pressure sensors 21a to 21d are sent as electric signals to the mixer 22, and the electric signals are synthesized together. Then, the electric signal synthesized by the mixer 22 is converted into a digital signal by the A/D converter 23, and the digital signal is sent to the signal processing unit 24.

The signal processing unit 24 is configured to filter the digital signal sent from the A/D converter 23 to change frequency characteristics, and includes filters 25 and maps 25a, 25b, and 25c. The filters 25 are formed of, for example, a plurality of filters "a" and "b" shown in FIG. 7. The filter "a" represented by the solid line of FIG. 7 increases a gain in a low-frequency range and in a high-frequency range, and decreases a gain in a range therebetween. Further, the filter "b" represented by the broken line of FIG. 7 decreases the gain in the low-frequency range and in the high-frequency range, and increases the gain in the range therebetween. Although the illustration is omitted, the filters 25 include a filter other than the filters "a" and "b", and an arbitrary filter may be selected from among those filters.

Figure 7:
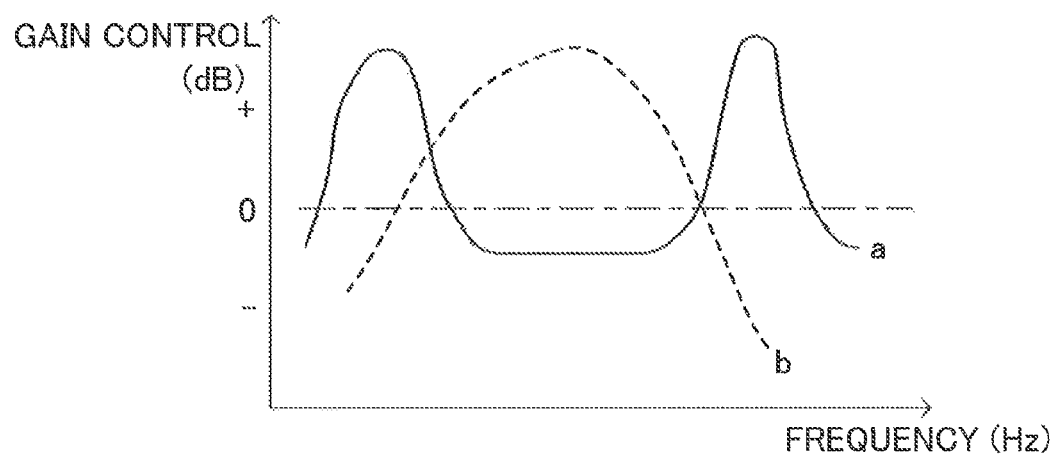
[FIG. 7] A graph showing filter characteristics.

For example, by selecting one of the filters "a" and "b" of FIG. 7, the sound quality can be changed variously to an engine sound of a normal car or an engine sound of a sport car. The map 25a is configured to change the gain of the sound pressure signal sent from the A/D converter 23 and the entire gain of the filter characteristics of the filters 25, and is formed of, for example, a sound pressure amplification map shown in FIG. 8. The sound pressure amplification map is configured to increase the gain of the output signals of the pressure sensors 21a to 21d and the entire gain of the filters 25 based on an rpm of the engine 12 detected by the rotation sensor 31 and the opening degree of the throttle valve detected by the opening degree sensor 32.

Figure 8:
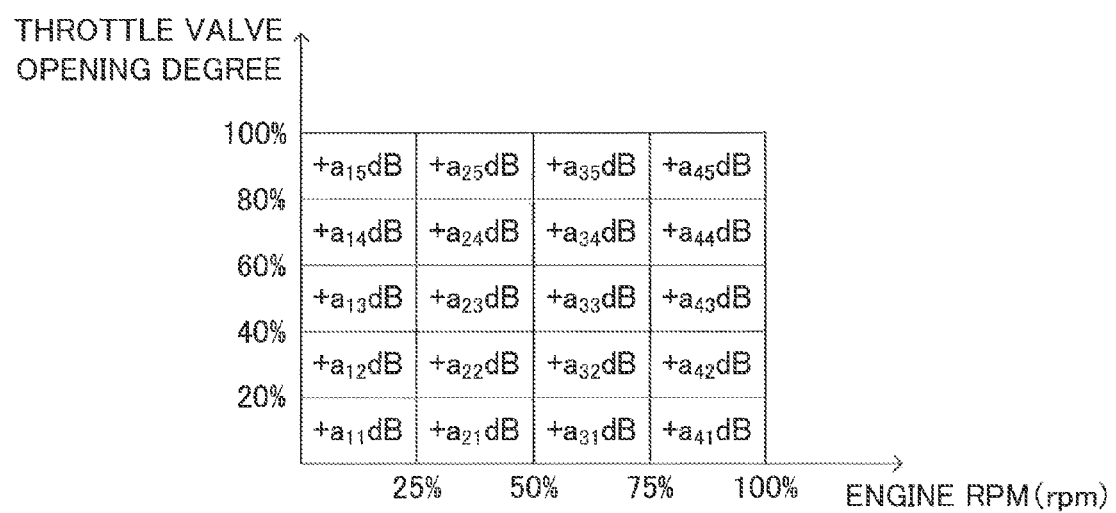
[FIG. 8] A map showing a sound pressure which increases and decreases based on an engine rpm and a throttle valve opening degree.

In the sound pressure amplification map of FIG. 8, a range between the minimum value (0) and the maximum value of the engine rpm represented by the horizontal axis is divided into four equal parts and a range between the minimum value (0) and the maximum value (100) of the throttle valve opening degree represented by the vertical axis is divided into five equal parts. The sound pressure amplification map shows gains to be increased in intersection regions between the regions of the engine rpm and the regions of the throttle valve opening degree. With the map 25a, interpolation is performed based on a value obtained from the engine rpm and the throttle valve opening degree, to thereby increase the gain of the output signals of the pressure sensors 21a to 21d and the entire gain of the filters 25.

Figure 9:
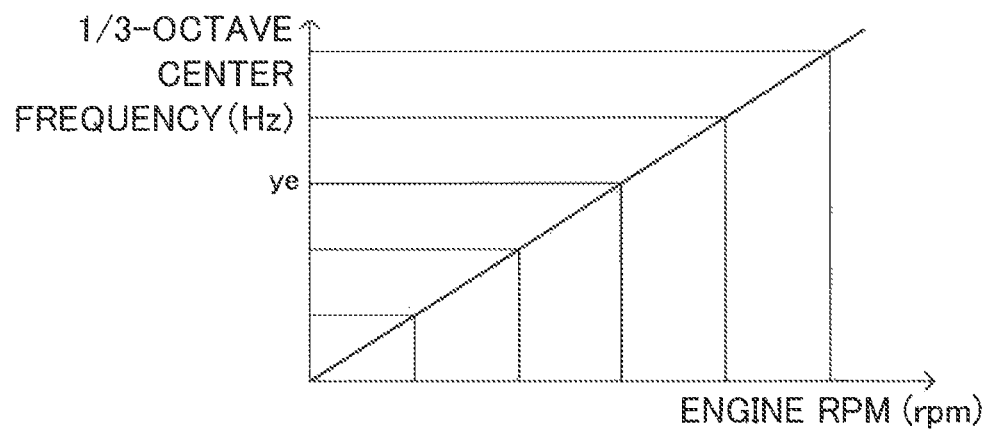
[FIG. 9] A graph showing a relationship between the engine rpm and a ⅓-octave frequency.
Figure 10:
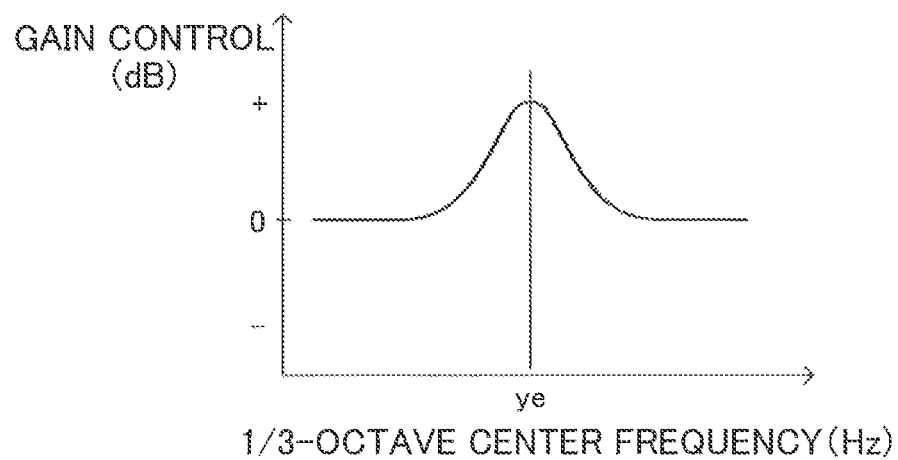
[FIG. 10] A gain control map showing a relationship between the ⅓-octave frequency and a gain.

The map 25b is configured to change a partial gain of the sound pressure signal sent from the A/D converter 23 and the filter characteristics of the filters 25, and is formed of a ⅓-octave center frequency graph of FIG. 9 showing a relationship between the engine rpm detected by the rotation sensor 31 and a ⅓-octave center frequency and a gain control graph of FIG. 10. With the ⅓-octave center frequency graph of FIG. 9, the ⅓-octave center frequency is determined based on the engine rpm detected by the rotation sensor 31, and with the gain control graph of FIG. 10, a gain value at the ⅓-octave center frequency is determined. The gain is increased by the determined value at the corresponding frequency in the output signals of the pressure sensors 21a to 21d and in the filter characteristic map.

Figure 11:
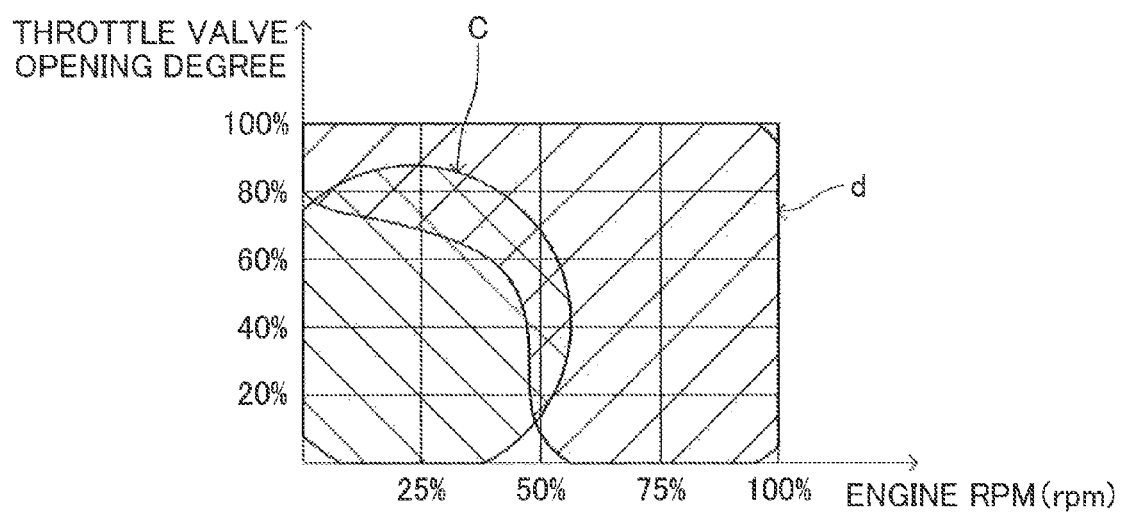
[FIG. 11] An effector processing map based on the engine rpm and the throttle valve opening degree.

The map 25c is configured to further perform compressor processing and reverberator processing for the pressure signals output from the pressure sensors 21a to 21d and the sound pressure signal processed based on the filter characteristics of the filters 25, and is formed of an effector processing map shown in FIG. 11. In the effector processing map of FIG. 11, a range between the minimum value (0) and the maximum value of the engine rpm represented by the horizontal axis is divided into four equal parts and a range between the minimum value (0) and the maximum value (100) of the throttle valve opening degree represented by the vertical axis is divided into five equal parts. Intersection regions between the regions of the engine rpm and the regions of the throttle valve opening degree are classified into regions for the compressor processing and regions for the reverberator processing. With the effector processing map, effector processing is performed for the sound pressure signal in accordance with a value obtained from the engine rpm and the throttle valve opening degree.

In this case, the compressor processing for boosting the sound pressure is performed in a low rpm/low load state represented by the region "c" of FIG. 11, in which both of a value of the engine rpm detected by the rotation sensor 31 and a value of the throttle valve opening degree detected by the opening degree sensor 32 are small. In addition, the reverberator processing is performed in a high rpm state, in which the value of the engine rpm detected by the rotation sensor 31 is large, in a high load state, in which the value of the throttle valve opening degree detected by the opening degree sensor 32 is large, and in a high rpm/high load state, in which both the values are large. Note that, the high rpm state, the high load state, and the high rpm/high load state are represented by the region "d" of FIG. 11. Accordingly, in the low rpm/low load state, the sound pressure is boosted, and in the other states, a reverberation effect is exerted on an air intake sound to be generated from the loudspeakers, to thereby produce persistence of sound.

The digital signal processed by the signal processing unit 24 is converted into an analog signal by the D/A converter 26, and is amplified by the amplifier 27. After that, sound is generated from the loudspeakers 28a and 28b. The loudspeakers 28a and 28b are provided on both sides in the front of the vehicle body 11, and as illustrated in FIG. 1, the loudspeaker 28a is installed inside a glove compartment which is provided on the left side of a dashboard provided in the front of the vehicle body 11, while the loudspeaker 28b is installed inside a wall panel on the right side of the dashboard. The loudspeakers 28a and 28b are both installed in such directions as to generate sound toward the inside of the vehicle from the engine 12 side.

The control unit 30 is connected to the memory unit 35, and the memory unit 35 stores a control program for controlling the sound generating device 20 for a vehicle, various kinds of data, and the like. The control unit 30 executes the control program stored in the memory unit 35 based on a signal from each sensor described later. The rotation sensor 31, which is installed on the engine 12, detects the rpm of the engine 12, and sends a detection value thereof as a signal to the control unit 30. The opening degree sensor 32, which is installed on the shaft of the throttle valve, detects a rotational angle of the shaft as the opening degree of the throttle valve, and sends a detection value thereof as a signal to the control unit 30.

The vehicle speed sensor 33, which is installed in the front of a transmission, detects a running speed of the automobile 10, and sends a detection value thereof as a signal to the control unit 30. The operation unit 34, which is installed on the surface of the dashboard, includes a selector switch, three pushbutton switches, and other operating elements. When the selector switch is operated, an arbitrary filter is selected from among the filters 25. Note that, the selector switch may be set so as not to select any filter. The three pushbutton switches correspond to the maps 25a, 25b, and 25c, respectively, and through ON/OFF operation of the three pushbutton switches, it is possible to set whether or not to perform the processing through use of the respective maps 25a, 25b, and 25c.

The other operating elements include a main switch for turning ON and OFF the sound generating device 20 for a vehicle, an operating element for controlling the entire volume level of the loudspeakers 28a and 28b, a localization operating element for controlling localization of sound by changing a volume level balance of the sound generated from the loudspeakers 28a and 28b, and the like. Further, the selector switch and the like of the operation unit 34 may be operated remotely by radio, and for example, a mobile phone may be used for various kinds of switching operation. The signal processing unit 24 is reprogrammable via the mobile phone or the like.

Next, description is given of an operation of generating an air intake sound of the engine 12 from the loudspeakers 28a and 28b by activating the sound generating device 20 for a vehicle when the automobile 10 configured as described above is running, and control to be performed by the control unit 30. First, the selector switch of the operation unit 34 is operated to select an arbitrary filter from among the filters 25, and the three pushbutton switches are operated to set whether or not to perform the processing through use of the respective maps 25a, 25b, and 25c. Subsequently, a start switch is turned ON to activate the engine 12, and the main switch for the sound generating device 20 for a vehicle is turned ON. Then, an accelerator is depressed to run the automobile 10. Accordingly, based on the detection values sent from the rotation sensor 31 and the opening degree sensor 32, the control unit 30 determines a predetermined value from each of the maps 25a, 25b, and 25c, and adds the value to the filter selected from among the filters 25.

Accordingly, the pressure signals output from the pressure sensors 21a to 21d are processed by the signal processing unit 24, and the loudspeakers 28a and 28b generate sound in accordance with the signals processed by the signal processing unit 24. The air intake sound to be generated from the loudspeakers 28a and 28b is changed in accordance with the changes in detection values from the pressure sensors 21a to 21d, the rotation sensor 31, and the opening degree sensor 32. Note that, when the operation unit 34 is set so as not to select any filter from among the filters 25 and all the three pushbutton switches are turned OFF, the sound pressure signal is not processed and the loudspeakers 28a and 28b generate sound based on the pressure signals output from the pressure sensors 21a to 21d. Further, the air intake sound generated from the loudspeakers 28a and 28b is audible only to an occupant inside the vehicle without leaking substantially to the outside of the vehicle under a state in which the window of the automobile 10 is closed.

As described above, in the sound generating device 20 for a vehicle according to this embodiment, the pressure sensors 21a to 21d are provided on the air intake duct 15 at the positions in the vicinity of the air flow meter 18. Therefore, the pressure sensors 21a to 21d are not affected by a combustion sound because the pressure sensors 21a to 21d are located too close to the engine 12, nor hindered from detecting the intake air pressure pulsation because the pressure sensors 21a to 21d are located too close to the outside. Thus, the pressure sensors 21a to 21d can detect the intake air pressure pulsation of the engine 12 under a state in which noise is reduced.

Accordingly, the air intake sound generated from the loudspeakers 28a and 28b becomes close to the actual air intake sound of the engine 12.

Note that, the lengths between the air flow meter 18 and the center portions of the proximal end portions of the communication portions 29a to 29d for connecting the above-mentioned pressure sensors 21a to 21d to the air intake duct 15 are determined through an experiment, and it is preferred that each length be set to 20 cm or less. In this experiment, satisfactory results were obtained when the lengths between the air flow meter 18 and the center portions of the proximal end portions of the communication portions 29a to 29d were set to 20 cm or less under a condition that the length of the air intake duct 15 was set to 40 cm as the minimum length. When the length of the air intake duct 15 is 40 cm or more, the lengths between the air flow meter 18 and the center portions of the proximal end portions of the communication portions 29a to 29d may be set to 20 cm or more, but also in this case, the communication portions 29a to 29d are connected on the air flow meter 18 side with respect to the center of the air intake duct 15.

Further, the pressure sensors 21a to 21d used in this embodiment have a sensitivity range from 1 Hz to 2 kHz, and the pressure sensors 21a to 21d are connected equiangularly to the outer peripheral portion of the air intake duct 15 through the tubular communication portions 29a to 29d each having a length of 4 cm. In this manner, the sensitivity range of the pressure sensors 21a to 21d is set to 1 Hz to 2 kHz, and hence only a comfortable sound can be generated from the loudspeakers 28a and 28b without noise uncomfortable to the occupant. In addition, the lengths of the communication portions 29a to 29d are set to 4 cm or less, and hence resonance can be prevented from occurring in the communication portions 29a to 29d.

That is, in the case of the tubular members as with the communication portions 29a to 29d, in which the proximal end portions on the air intake duct 15 side are opened and the distal end portions are closed by the respective pressure sensors 21a to 21d, the resonance occurs when the lengths are equal to or more than a quarter of the wavelength. Therefore, the lengths of the communication portions 29a to 29d are set to 4 cm or less so that the lengths become smaller than a quarter of the wavelength of the frequency to be determined. Accordingly, the resonance can be prevented. In addition, the pressure sensors 21a to 21d are provided through the respective communication portions 29a to 29d, and thus the adverse effect on the detection to be performed by the pressure sensors 21a to 21d can be prevented.

Further, the communication portions 29a to 29d extend upward from the upper portion of the outer peripheral surface of the air intake duct 15, and hence, even when oil stagnates inside the air intake duct 15, the oil can be prevented from flowing toward the pressure sensors 21a to 21d. In addition, the pressure sensors 21a to 21d can measure both the positive pressure and the negative pressure, and hence all the air intake pulsation can be extracted accurately without erasing the air intake pulsation. Still further, the four pressure sensors 21a to 21d are provided, and hence the pressure signal can be amplified, thereby enabling accurate detection of the pressure signal even in the low load state, in which the depressing amount of the accelerator is small. Moreover, the four pressure sensors 21a to 21d are located in the same cross section of the air intake duct 15, and hence the intake air pressures obtained substantially at the same part in the air intake duct 15 are averaged to reduce noise, thereby increasing the S/N ratio.

Further, in this embodiment, the signal processing can be performed through use of the filter characteristics of the filters 25, and hence the gain can be changed arbitrarily in accordance with each frequency. The filters 25 have a plurality of filter characteristics, and hence the sound quality of the air intake sound to be output from the loudspeakers 28a and 28b can be changed variously. In addition, the sound pressure amplification map of the map 25a is used for the signal processing to be performed by the signal processing unit 24, and hence the gain of the pressure signals output from the pressure sensors 21a to 21d and the entire gain of the filter characteristics can be increased. With this configuration, the air intake sound to be output from the loudspeakers 28a and 28b can be reproduced inside the vehicle cabin as an air intake sound having an attenuation characteristic and a sound transmission loss close to those of the actual air intake sound of the engine 12.

Further, the gain control map of the map 25b is used for the signal processing to be performed by the signal processing unit 24, and hence the sound pressure signal can be intensified based on the engine rpm in accordance with an order component. In addition, the effector processing map of the map 25c is used for the signal processing to be performed by the signal processing unit 24, and hence the compressor processing can be performed in the low rpm/low load state, in which both of the value of the engine rpm and the value of the throttle valve opening degree are small, while the reverberator processing can be performed in the high rpm state, in which the value of the engine rpm is large, in the high load state, in which the value of the throttle valve opening degree is large, and in the high rpm/high load state, in which both the values are large.

In this manner, the compressor processing or the reverberator processing is performed in accordance with the driving condition of the automobile 10, and hence the sound pressure can be boosted and the reverberation effect can be exerted on the air intake sound to be generated from the loudspeakers 28a and 28b, to thereby produce the persistence of sound. Further, the loudspeakers 28a and 28b are arranged on both sides of the dashboard provided in the front of the vehicle body 11 to generate sound toward the inside of the vehicle from the engine 12 side. Accordingly, the air intake sound output from the loudspeakers 28a and 28b is audible from the engine 12 side, and hence the occupant may feel as if he/she heard the actual air intake sound of the engine 12.

(Second Embodiment)

Figure 12:
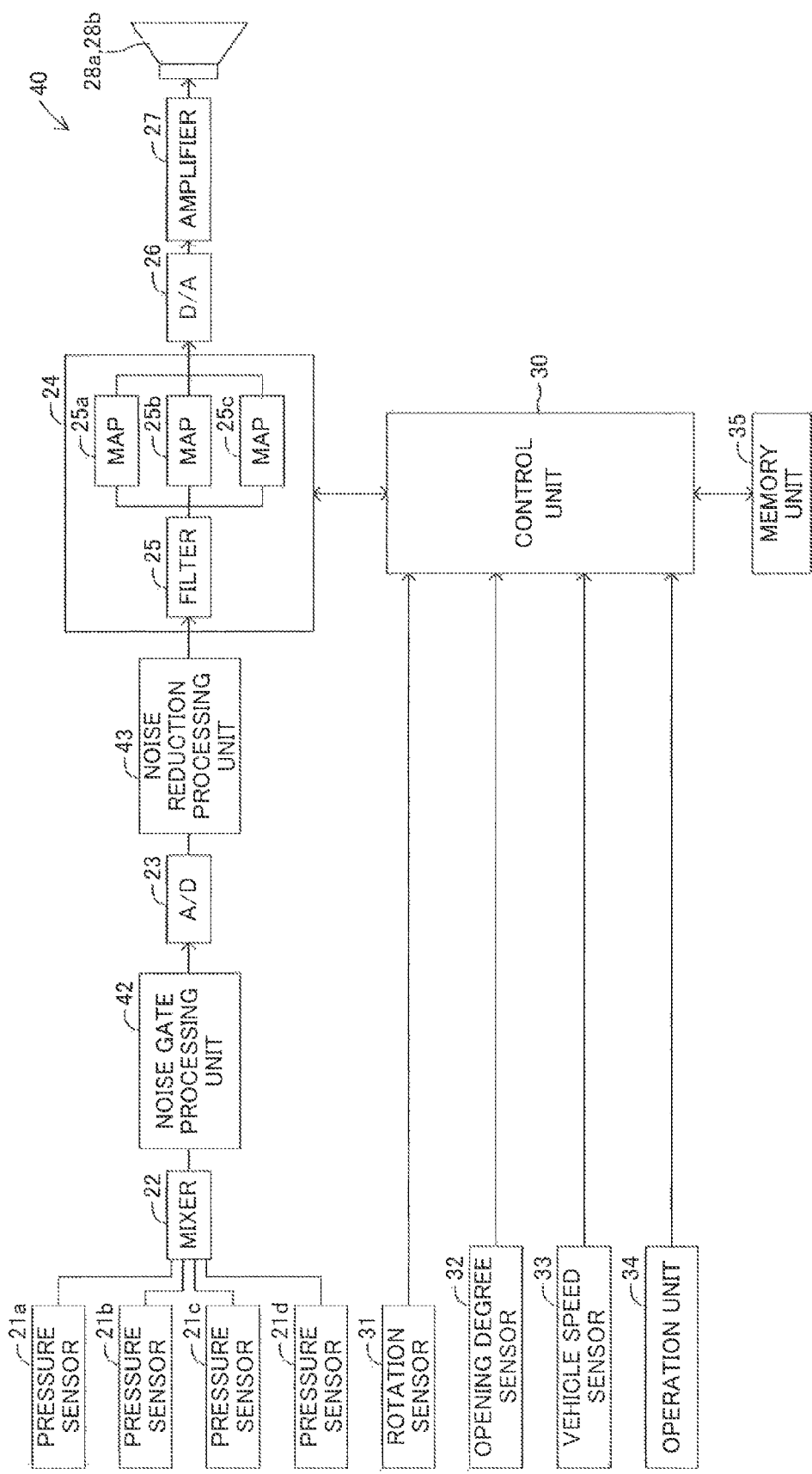
[FIG. 12] A block diagram of a sound generating device for a vehicle according to a second embodiment of the present invention.

FIG. 12 illustrates a configuration of a sound generating device 40 for a vehicle according to a second embodiment of the present invention. The sound generating device 40 for a vehicle includes a noise gate processing unit 42 and a noise reduction processing unit 43. Other components of the sound generating device 40 for a vehicle are the same as those of the above-mentioned sound generating device 20 for a vehicle. Thus, in FIG. 12, the same components are represented by the same reference symbols. The noise gate processing unit 42 performs noise gate processing for the electric signal synthesized by the mixer 22. The noise gate processing is performed for the purpose of reducing noise. Specifically, when the value of the input signal is equal to or less than a predetermined threshold value, the gain of a frequency spectrum is decreased to close a gate, and when the value of the input signal is equal to or more than the predetermined threshold value, the gate is opened to send the signal to the A/D converter 23. That is, the noise gate processing unit 42 performs processing of removing a sound having a given volume level or lower as noise. Then, the electric signal sent to the A/D converter 23 is converted into a digital signal, and the digital signal is sent to the noise reduction processing unit 43. Note that, the noise gate processing may be performed for the signal converted as a digital signal.

The noise reduction processing unit 43 performs noise reduction processing for the electric signal converted as a digital signal by the A/D converter 23. The noise reduction processing is performed by performing fast Fourier transform (FFT) for the electric signal. Specifically, data on the signal sent from the A/D converter 23 and data on the noise appearing with a predetermined period are subjected to Fourier transform to determine conversion values thereof. Then, the conversion value of the noise is subtracted from the conversion value of the signal data, and thereafter the signal data is converted back into the original signal data. In this manner, the noise is removed. In this case, a time domain signal is converted into a frequency domain signal, and noise contained in this signal is estimated. Then, the noise is removed from the frequency domain signal, and thereafter the frequency domain signal is inversely converted into the time domain signal. Through such processing called spectral subtraction processing, an electric signal free from noise is obtained, and this electric signal is sent to the signal processing unit 24. In this case, noise reduction processing other than the spectral subtraction processing may be employed as a matter of course.

The components of the sound generating device 40 for a vehicle other than the noise gate processing unit 42 and the noise reduction processing unit 43 have functions similar to those of the corresponding components of the above-mentioned sound generating device 20 for a vehicle. The sound generating device 40 for a vehicle is configured as described above, and hence natural sound can be generated by removing or reducing the noise in the unnecessary range which is contained in the air intake sound to be output from the loudspeakers 28a and 28b. Other actions and effects of the sound generating device 40 for a vehicle are similar to the actions and effects of the above-mentioned sound generating device 20 for a vehicle. Note that, in the above-mentioned second embodiment, both the noise gate processing unit 42 and the noise reduction processing unit 43 are provided, but one of the noise gate processing unit 42 and the noise reduction processing unit 43 may be omitted. Further, the processing of the noise gate processing unit 42 and the processing of the noise reduction processing unit 43 may be performed for an analog signal and for a digital signal.

(Third Embodiment)

Figure 13:
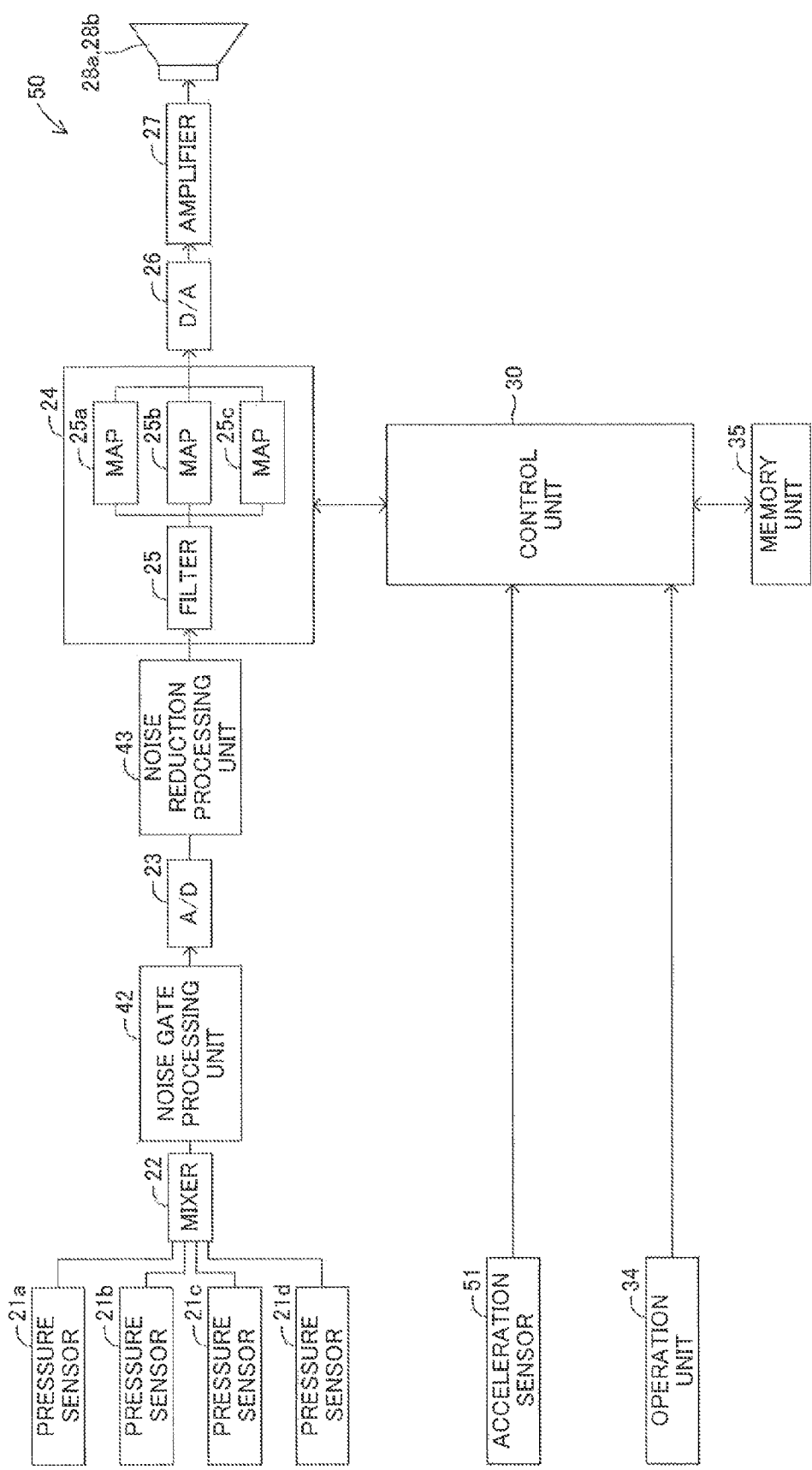
[FIG. 13] A block diagram of a sound generating device for a vehicle according to a third embodiment of the present invention.

FIG. 13 illustrates a configuration of a sound generating device 50 for a vehicle according to a third embodiment of the present invention. The sound generating device 50 for a vehicle includes an acceleration sensor 51 instead of the rotation sensor 31, the opening degree sensor 32, and the vehicle speed sensor 33 of the above-mentioned sound generating device 40 for a vehicle. The acceleration sensor 51 may be installed at, for example, a center bottom portion of the vehicle body 11 of the automobile 10 illustrated in FIG. 1. Other components of the sound generating device 50 for a vehicle are the same as those of the above-mentioned sound generating device 40 for a vehicle. Thus, the same components are represented by the same reference symbols, and description thereof is therefore omitted herein.

As described above, the sound generating device 50 for a vehicle includes the acceleration sensor 51. Accordingly, based on a value of acceleration detected by the acceleration sensor 51, sound pressure amplification processing can be performed for the pressure signals output from the pressure sensors 21a to 21d, and the entire gain of the filter characteristics for processing the pressure signals output from the pressure sensors 21a to 21d can be increased. In this case, the filters 25, the map 25a, and the like are configured to determine, in accordance with the acceleration of the automobile 10, a frequency domain in which the gain is increased and decreased, and increase the gain of the output signals of the pressure sensors 21a to 21d and the entire gain of the filters 25. Further, the acceleration sensor 51 may be installed at an arbitrary position of the vehicle, and hence the installation is facilitated without the need to process the automobile 10 or lay complicated wiring. Other actions and effects of the sound generating device 50 for a vehicle are similar to the actions and effects of the above-mentioned sound generating device 40 for a vehicle.

(Fourth Embodiment)

Figure 14:
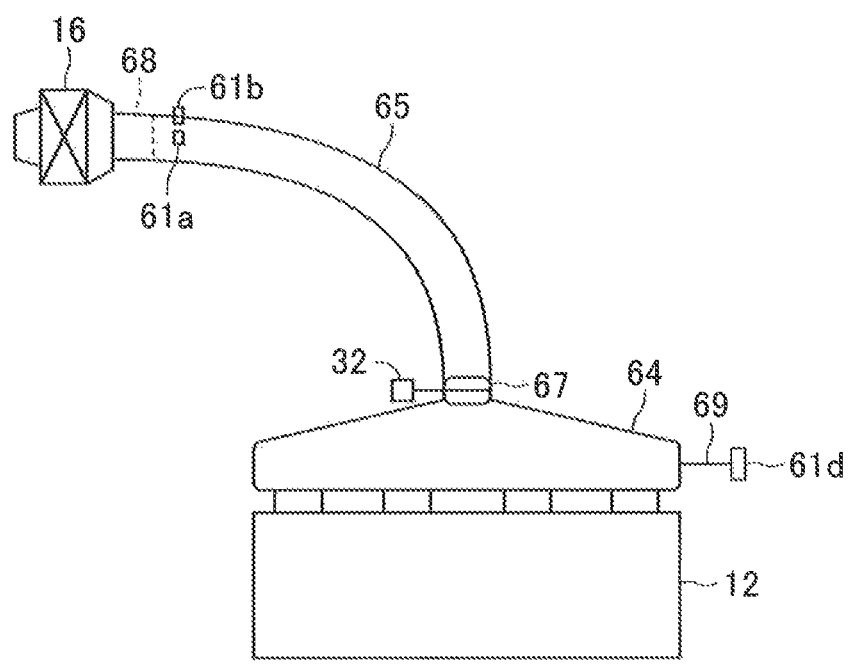
[FIG. 14] A schematic view illustrating installation positions of pressure sensors of a sound generating device for a vehicle according to a fourth embodiment of the present invention.
Figure 15:
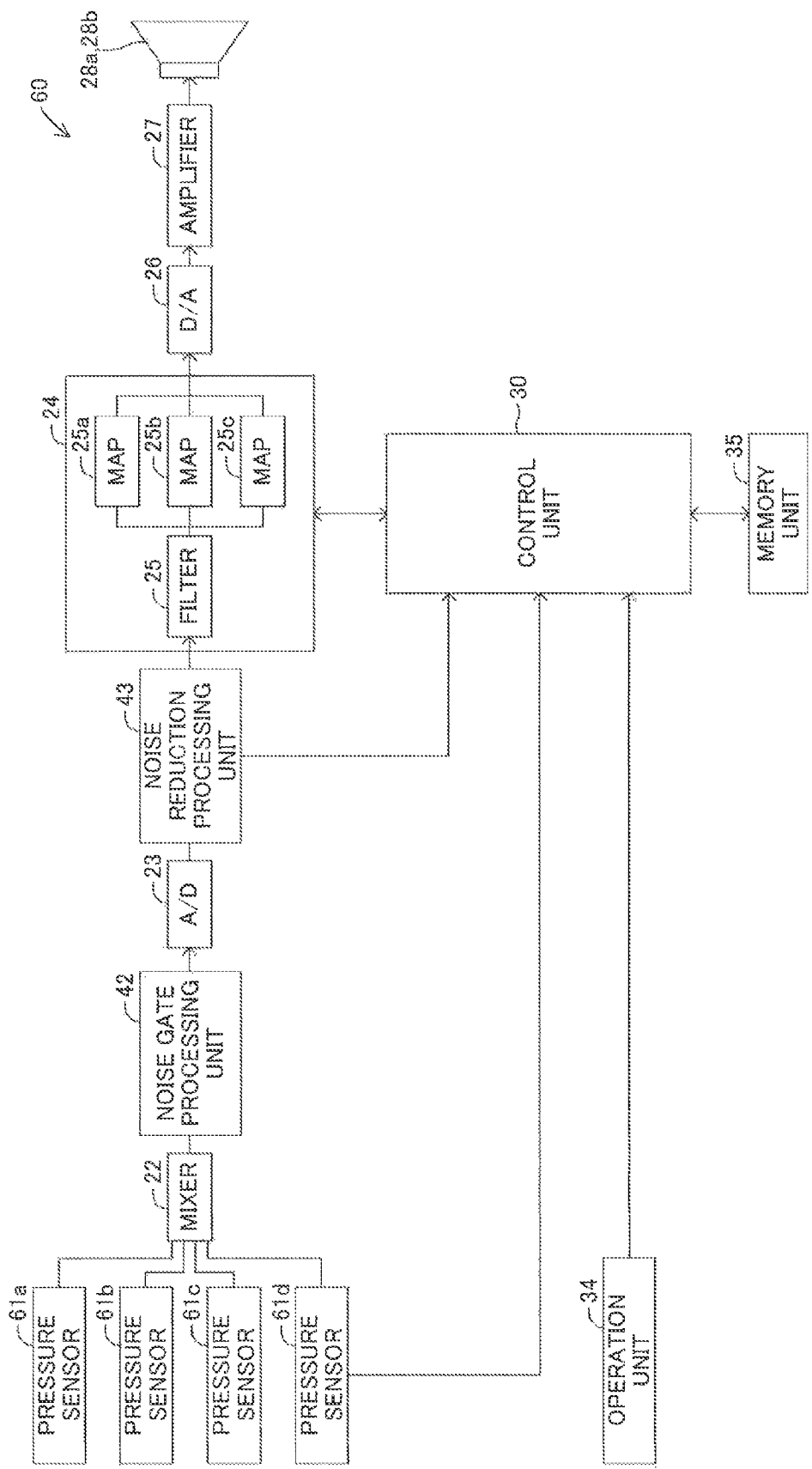
[FIG. 15] A block diagram of the sound generating device for a vehicle according to the fourth embodiment of the present invention.

FIG. 14 is a schematic view illustrating installation positions of pressure sensors 61a to 61d of a sound generating device 60 for a vehicle (see FIG. 15) according to a fourth embodiment of the present invention. FIG. 15 is a block diagram illustrating a configuration of the sound generating device 60 for a vehicle. The sound generating device 60 for a vehicle includes four pressure sensors 61a, 61b, 61c, and 61d, and of those pressure sensors, the pressure sensors 61a, 61b, and 61c are connected to an upper portion of the outer periphery of an air intake duct 65 at positions in the vicinity of an air flow meter 68 through three tubular communication portions (not shown) provided equiangularly. The pressure sensors 61a to 61c are configured to output pressures of air intake pulsation in the air intake duct 65 as a voltage fluctuation. Note that, the communication portions for connecting the pressure sensors 61a to 61c to the air intake duct 65 have the same configurations as the above-mentioned communication portions 29a to 29d, respectively.

The pressure sensor 61d is installed on an outer wall surface of a surge tank 64 which is arranged on a downstream side of a throttle body 67 to serve as a second pressure sensor according to the present invention, and is the same sensor as the pressure sensors 61a to 61c. The pressure sensor 61d is configured to output air intake pulsation generated on the downstream side of the throttle body 67 as a voltage fluctuation. The pressure sensor 61d is connected to the outer wall surface of the surge tank 64 through a communication portion 69. The communication portion 69 is formed of a flexible resin tube or rubber hose tube having the same inner and outer diameters as the communication portions 29a to 29d, and a length of 50 cm.

The sound generating device 60 for a vehicle does not include the rotation sensor 31, the opening degree sensor 32, and the vehicle speed sensor 33, which are provided to the sound generating device 40 for a vehicle according to the second embodiment. The pressure sensor 61d is also connected to the control unit 30 as well as the mixer 22. Other components of the sound generating device 60 for a vehicle are the same as those of the above-mentioned sound generating device 40 for a vehicle. Thus, in FIG. 15, the same components are represented by the same reference symbols, and description thereof is therefore omitted herein.

The sound generating device 60 for a vehicle is configured as described above, and hence it is possible to detect the air intake pulsation on the downstream side of the throttle body 67 as well as the upstream side. Accordingly, the air intake sound to be reproduced from the loudspeakers 28a and 28b corresponds to the air intake pulsation of the engine 12 irrespective of the open/close condition of the throttle body 67. Therefore, even in an idling, deceleration, or low load state, in which the throttle valve of the throttle body 67 is substantially closed or is opened at a small opening degree, the sound corresponding to the pulsation of the engine 12 can be generated. Further, the length of the communication portion 69 for connecting the pressure sensor 61d to the outer wall surface of the surge tank 64 is set as large as 50 cm, and hence harsh sound generated due to the pulsation of the engine 12 can be suppressed.

The pressure sensor 61d is connected to the control unit 30 via the noise gate processing unit 42, the A/D converter 23, the noise reduction processing unit 43, and the like, and hence an AC component signal is sent to the control unit 30 so that the rpm of the engine 12 can be recognized. In addition, the pressure sensor 61d is directly connected to the control unit 30, and hence a DC component signal is sent to the control unit 30 so that the load on the engine 12 can be recognized. In this case, as a part of the pressure signal to be output from the pressure sensor 61d, the DC component is removed through a filter (not shown) which cuts off a DC component and allows only an AC component to pass therethrough, and hence only the AC component is sent to the mixer 22. Further, as another part of the pressure signal to be output from the pressure sensor 61d, the AC component is removed through a filter (not shown) which cuts off an AC component and allows only a DC component to pass therethrough, and hence only the DC component is sent to the control unit 30.

The AC component signal is subjected to the noise reduction processing by the noise reduction processing unit 43, and thus serves as a signal which enables recognition of the rpm of the engine 12. In this case, a frequency band in which the noise is present is removed, and only a frequency band in which the air intake sound is present remains. Accordingly, the rpm of the engine 12 can be recognized more reliably. The DC component signal is directly sent to the control unit 30, and thus serves as a signal which enables recognition of the load on the engine 12. Based on those pieces of information, the driving condition is determined so that the sound pressure can be increased and decreased appropriately. In this case, the filters 25, the map 25a, and the like are configured to determine, in accordance with the output signals of the pressure sensors 61a to 61d, a frequency domain in which the gain is increased and decreased, and increase the entire gain of the filters 25.

According to the sound generating device 60 for a vehicle, the number of sensors can be reduced, and the configuration can be simplified and obtained at low cost. Other actions and effects of the sound generating device 60 for a vehicle are similar to the actions and effects of the above-mentioned second embodiment. Note that, as a modification example of the fourth embodiment, the sound generating device 60 for a vehicle may be provided with the rotation sensor 31, the opening degree sensor 32, and the vehicle speed sensor 33, which are provided to the sound generating device 40 for a vehicle according to the second embodiment, or may be provided with the acceleration sensor 51, which is provided to the sound generating device 50 for a vehicle according to the third embodiment.

(Fifth Embodiment)

Figure 16:
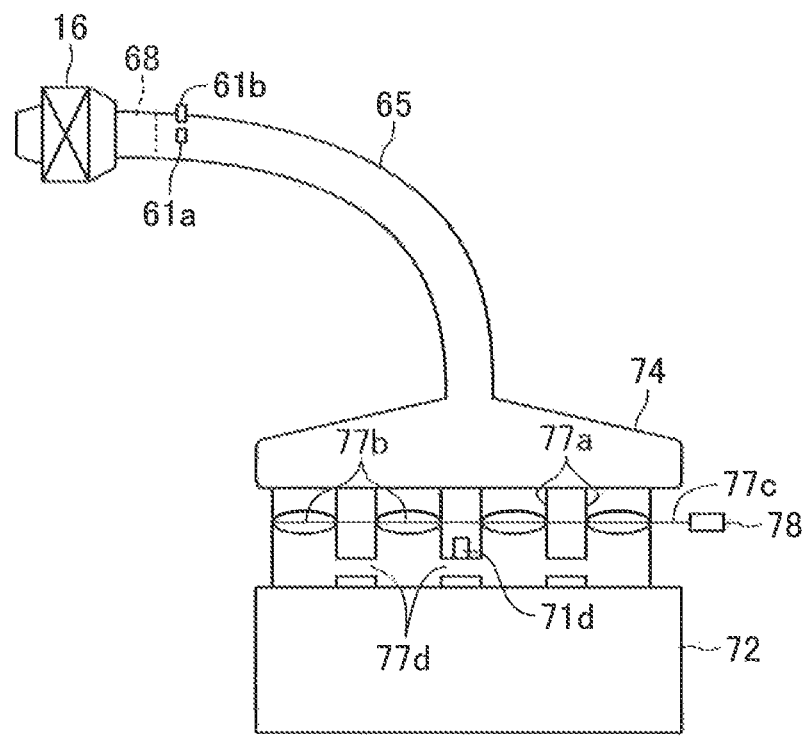
[FIG. 16] A schematic view illustrating an installation position of a pressure sensor of a sound generating device for a vehicle according to a fifth embodiment of the present invention.

FIG. 16 is a schematic view illustrating an installation position of a pressure sensor 71d as the second pressure sensor of a sound generating device for a vehicle according to a fifth embodiment of the present invention. In this embodiment, a plurality of throttle bodies 77a serving as the air amount control valve according to the present invention are provided between an engine 72 and a surge tank 74, and no throttle body is provided on the upstream side of the surge tank 74. Those throttle bodies are provided as an individual throttle body system including four throttle bodies 77a as a unit, and the throttle bodies 77a respectively include throttle valves 77b inside, which are operated in synchronization with one another by a single motor (not shown) and a single throttle shaft 77c. The throttle bodies 77a are provided in communication to one another through a balance pipe portion 77d at positions on the downstream side of the throttle valves 77b which are provided to the respective throttle bodies 77a. The second pressure sensor 71d is provided to the balance pipe portion 77d.

At an end portion of the throttle shaft 77c, there is provided an opening degree sensor 78 for detecting opening degrees of the throttle valves 77b. Other components of the sound generating device for a vehicle according to the fifth embodiment and the automobile to which the sound generating device for a vehicle is installed are the same as those of the above-mentioned fourth embodiment. Thus, the same components are represented by the same reference symbols, and description thereof is therefore omitted herein.

According to this embodiment, even in the case of the automobile including the individual throttle bodies 77a, the air intake sound of the engine 72 corresponding to the driving condition in accordance with the operation of the driver is clearly audible inside the vehicle while being emitted to the outside as a small sound. Further, the pressure sensor 71d is provided to the balance pipe portion 77d, and hence pulsation components of all the cylinders of the engine 72 can be detected. Other actions and effects of the sound generating device for a vehicle according to the fifth embodiment are similar to the actions and effects of the above-mentioned fourth embodiment.

Note that, as a modification example of the fifth embodiment, the sound generating device for a vehicle may be provided with the rotation sensor 31, the opening degree sensor 32, and the vehicle speed sensor 33, which are provided to the sound generating device 40 for a vehicle according to the second embodiment, or may be provided with the acceleration sensor 51, which is provided to the sound generating device 50 for a vehicle according to the third embodiment. With this configuration, the actions and effects produced in the second and third embodiments are added to the actions and effects produced in the fifth embodiment.

Further, although the illustration is omitted, as another embodiment of the present invention, there may be employed an engine including a continuously variable valve lift mechanism for controlling an engine output without using the throttle valve. The continuously variable valve lift mechanism is so-called Valvetronic (trademark), which is capable of controlling the engine output without using the throttle valve through stepless control of a lift of the air intake valve or the lift and the timing. In this case, the air intake valve serves as the air amount control valve according to the present invention. Therefore, in this embodiment, the second pressure sensor is not provided.

Figure 17:
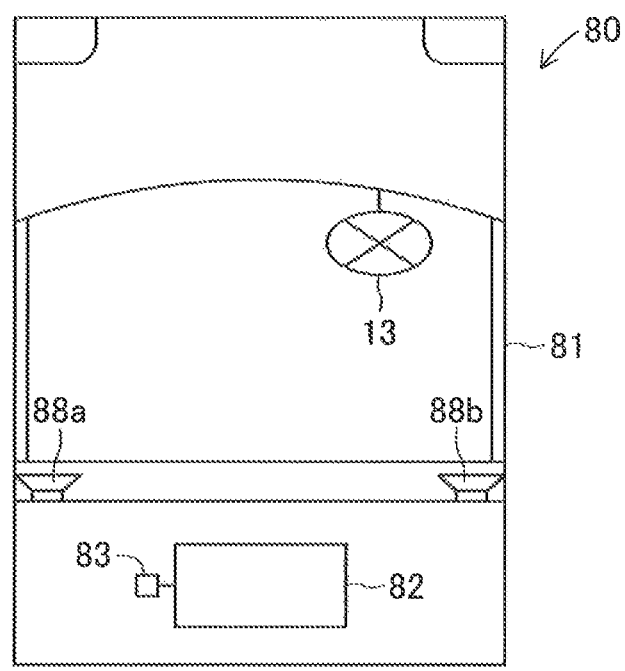
[FIG. 17] A schematic plan view illustrating an automobile including an engine arranged in the rear thereof.

Further, the sound generating device for a vehicle according to the present invention is not limited to the above-mentioned embodiments, but may be carried out with appropriate modifications. For example, in the above-mentioned embodiments, the automobile 10, which is an FF car or an FR car, is used as a vehicle, but an automobile 80 illustrated in FIG. 17, which is a mid-engine, rear-wheel-drive (MR) car or a rear-engine, rear-wheel-drive (RR) car, may be used instead of the automobile 10. In the automobile 80, a pair of loudspeakers 88a and 88b are provided on both sides behind the rear seat of a vehicle body 81. The loudspeakers 88a and 88b are both installed in such directions as to generate sound toward the inside of the vehicle from an engine 82 side.

Further, a rotation sensor 83 is provided on the engine 82. An opening degree sensor for detecting an opening degree of a throttle valve is provided on a throttle body. Other components of the sound generating device for a vehicle that is provided to the automobile 80 are the same as those of the above-mentioned sound generating device 20 for a vehicle. In the automobile 80, the loudspeakers 88a and 88b are arranged on both sides behind the rear seat of the vehicle body 81 to generate sound toward the inside of the vehicle from the engine 82 side that is installed in the rear of the vehicle body 81. Accordingly, the air intake sound generated from the loudspeakers 88a and 88b is audible from the engine 82 side, and hence the occupant may feel as if he/she heard the actual air intake sound of the engine 82.

Further, an odd number of loudspeakers may be provided and, in this case, one of the loudspeakers is provided at the center of the vehicle in a width direction, for example, on the dashboard provided in the front of the vehicle body. With this configuration, the air intake sound to be generated from the loudspeakers is prevented from becoming uneven on both sides, thereby improving the balance of sound. Further, the loudspeaker may be installed on a door or a wall surface inside the dashboard. In this manner, the installation position and the number of loudspeakers are set arbitrarily, with the result that the direction in which the air intake sound is audible can be changed and a stereophonic air intake sound can be obtained.

Further, the above-mentioned loudspeakers 28a and 28b and the like may be provided as loudspeakers dedicated to the sound generating device 20 for a vehicle and the like, or may also be used as loudspeakers for an audio system of the automobile 10 and the like. In addition, in the above-mentioned first and second embodiments, the signal processing unit 24 performs the processing of changing the sound pressure signal based on the engine rpm detected by the rotation sensor 31 and the throttle valve opening degree detected by the opening degree sensor 32, but a vehicle speed detected by the vehicle speed sensor 33 may be added as a parameter for this processing. Further, when the second pressure sensor is provided between the engine and the air amount control valve, a plurality of second pressure sensors may be provided. Moreover, the plurality of pressure sensors provided on the upstream side of the air amount control valve are not limited to four or three pressure sensors, but two, five, or more pressure sensors may be provided instead.

The invention claimed is:

1. A sound generating device for a vehicle that transmits an air intake sound of an engine of a vehicle to an occupant inside the vehicle, the sound generating device comprising:
   a plurality of pressure sensors that detect pressures of air intake pulsation of the engine and outputting the pressures as pressure signals,
   the plurality of pressure sensors being provided at an interval in a circumferential direction of an outer periphery of an air intake duct at positions on an air cleaner side of the air intake duct with respect to a center of the air intake duct,
   the air intake duct connecting the air cleaner to an air amount control valve,
   the air cleaner being provided on an air inlet side of the air intake duct on which outside air is to be taken in,
   the air amount control valve being provided on the engine side of the air intake duct;
   a signal processor that performs processing of changing the pressure signals in accordance with a driving condition of the vehicle; and
   a loudspeaker installed inside the vehicle that outputs a sound pressure signal processed by the signal processor as the air intake sound of the engine.

2. The sound generating device for a vehicle according to claim 1, further comprising a downstream pressure sensor provided between the engine and the air amount control valve in addition to the plurality of pressure sensors,
   the downstream pressure sensor detecting a pressure of the air intake pulsation of the engine and output the pressure as a pressure signal.

3. The sound generating device for a vehicle according to claim 2, further comprising a tubular communication portion which extends outward and is provided at a position between the engine and the air amount control valve, the downstream pressure sensor being installed at the position between the engine and the air amount control valve,
   wherein the downstream pressure sensor is installed at a distal end of the tubular communication portion, and
   wherein a distance between a proximal end portion of the tubular communication portion and a pressure sensitive portion of the downstream pressure sensor is set to 4 cm or more.

4. The sound generating device for a vehicle according to claim 2, wherein the downstream pressure sensor measures both a positive pressure and a negative pressure.

5. The sound generating device for a vehicle according to claim 2, wherein the downstream pressure sensor outputs a pulsating current signal containing an AC component and a DC component.

6. The sound generating device for a vehicle according to claim 2,
   wherein the engine comprises an individual throttle body system including throttle bodies arranged for respective cylinders,
   wherein the air amount control valve comprises throttle valves of the throttle bodies,
   wherein the throttle bodies are provided in communication to one another through a balance pipe portion at positions on a downstream side of the throttle valves which are provided to the throttle bodies, respectively, and
   wherein the downstream pressure sensor is provided on the balance pipe portion.

7. The sound generating device for a vehicle according to claim 1,
   wherein the engine includes a continuously variable valve lift mechanism that controls an engine output through stepless control of a lift of an air intake valve and a timing, and
   wherein the air amount control valve comprises the air intake valve.

8. The sound generating device for a vehicle according to claim 1, further comprising a noise gate processor that performs noise gate processing for the pressure signals before being processed by the signal processor.

9. The sound generating device for a vehicle according to claim 1, further comprising a noise reduction processor that performs noise reduction processing for the pressure signals before or after being processed by the signal processor.

10. The sound generating device for a vehicle according to claim 1, further comprising a filter created based on a relationship between a frequency and a gain,
    wherein the signal processor performs processing of changing the sound pressure signal through use of the filter.

11. The sound generating device for a vehicle according to claim 1,
    wherein the air amount control valve comprises a throttle valve of a throttle body,
    wherein the sound generating device further comprises:
    a rotation sensor that detects an rpm of the engine;
    an opening degree sensor that detects an opening degree of the throttle valve; and a sound pressure amplification map created based on a relationship between the rpm of the engine detected by the rotation sensor and the opening degree of the throttle valve detected by the opening degree sensor, and wherein the signal processor performs sound pressure amplification processing for the sound pressure signal through use of the sound pressure amplification map.

12. The sound generating device for a vehicle according to claim 1, further comprising:

a rotation sensor detects an rpm of the engine; and a gain control map created based on a relationship between the frequency and the gain, wherein the signal processor determines the frequency based on the rpm of the engine detected by the rotation sensor and a number of the cylinders of the engine, and controls the gain for the sound pressure signal through use of a value of the determined frequency and the gain control map.

13. The sound generating device for a vehicle according to claim 1, wherein the air amount control valve comprises a throttle valve of a throttle body, wherein the sound generating device further comprises:

a rotation sensor that detects an rpm of the engine;

an opening degree sensor that detects an opening degree of the throttle valve; and an effector processing map including a compressor processing region and a reverberator processing region, the effector processing map being created based on a relationship between the rpm of the engine detected by the rotation sensor and the opening degree of the throttle valve detected by the opening degree sensor, and wherein the signal processor performs compressor processing or reverberator processing for the sound pressure signal through use of the effector processing map.

14. The sound generating device for a vehicle according to claim 13, wherein the compressor processing is performed when both of a value of the rpm of the engine detected by the rotation sensor and a value of the opening degree of the throttle valve detected by the opening degree sensor are small, and the reverberator processing is performed when one or both of the value of the rpm of the engine detected by the rotation sensor and the value of the opening degree of the throttle valve detected by the opening degree sensor are large.

15. The sound generating device for a vehicle according to claim 1, further comprising:

an acceleration sensor that detects an acceleration of the vehicle; and a sound pressure amplification map created based on the acceleration of the vehicle detected by the acceleration sensor, wherein the signal processor performs sound pressure amplification processing for the sound pressure signal through use of the sound pressure amplification map.

16. The sound generating device for a vehicle according to claim 1, further comprising an air flow meter installed in the vicinity of the air cleaner, that detects a flow rate of air, wherein the plurality of pressure sensors are provided to the air intake duct at positions within a range of 20 cm or less from the air flow meter toward the air amount control valve.

17. The sound generating device for a vehicle according to claim 1, further comprising a plurality of tubular communication portions which extend outward from an outer peripheral portion of the air intake duct, wherein the plurality of pressure sensors are installed at distal ends of the plurality of tubular communication portions, respectively, and wherein a distance between a proximal end portion of each of the plurality of tubular communication portions on the air intake duct side and each of pressure sensitive portions of the plurality of pressure sensors is set to 4 cm or less.

18. The sound generating device for a vehicle according to claim 1, wherein the plurality of pressure sensors measure both a positive pressure and a negative pressure, and outputs from the plurality of pressure sensors are added together.

19. The sound generating device for a vehicle according to claim 1, wherein output signals of the plurality of pressure sensors are sent to the signal processor after DC components are removed through a filter.

20. A sound generating method for a vehicle that transmits an air intake sound of an engine of a vehicle to an occupant inside the vehicle, the sound generating method comprising:

a pressure signal outputting step of detecting pressures of air intake pulsation of the engine and outputting the pressures as pressure signals by a plurality of pressure sensors provided at an interval in a circumferential direction of an outer periphery of an air intake duct at positions on an air cleaner side of the air intake duct with respect to a center of the air intake duct, the air intake duct connecting the air cleaner to an air amount control valve, the air cleaner being provided on an air inlet side of the air intake duct on which outside air is to be taken in, the air amount control valve being provided on the engine side of the air intake duct;

a signal processing step of performing, by a signal processor processing of changing the pressure signals in accordance with a driving condition of the vehicle; and an air intake sound outputting step of outputting, by a loudspeaker installed inside the vehicle, a sound pressure signal subjected to the signal processing as the air intake sound of the engine.

* * * * *